(12) United States Patent
Kwon et al.

(10) Patent No.: US 7,840,209 B2
(45) Date of Patent: Nov. 23, 2010

(54) REPLY VOICE MESSAGE TRANSMISSION SYSTEM AND METHOD THEREOF

(75) Inventors: Hyun-Hoon Kwon, Seoul (KR); Tae-Wook Park, Seoul (KR); Young-Ahn Ryu, Gyeonggi-do (KR); Il-Weon Cho, Seoul (KR); Ki-Mun Kim, Seoul (KR); Hee-Hyeok Hahm, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 719 days.

(21) Appl. No.: 11/574,679

(22) PCT Filed: Jun. 3, 2005

(86) PCT No.: PCT/KR2005/001673

§ 371 (c)(1),
(2), (4) Date: Oct. 1, 2007

(87) PCT Pub. No.: WO2006/043742

PCT Pub. Date: Apr. 27, 2006

(65) Prior Publication Data

US 2008/0032674 A1    Feb. 7, 2008

(30) Foreign Application Priority Data

Sep. 6, 2004    (KR) .................. 10-2004-0070784

(51) Int. Cl.
*H04M 11/10* (2006.01)
*H04M 1/64* (2006.01)
*H04M 11/00* (2006.01)
*H04M 1/725* (2006.01)
*H04M 3/42* (2006.01)

(52) U.S. Cl. .................. 455/413; 455/412.1; 455/412.2; 455/414.1; 379/88.12; 379/88.18; 379/88.22

(58) Field of Classification Search .............. 455/412.1, 455/412.2, 413, 414.1; 379/88.12, 88.13, 379/88.17, 88.18
See application file for complete search history.

(56) References Cited

U.S. PATENT DOCUMENTS 6,650,740 B1   11/2003   Adamczyk et al.
7,218,919 B2 *  5/2007   Vaananen ................. 455/412.1
7,444,375 B2 * 10/2008   McConnell et al. ......... 709/206

FOREIGN PATENT DOCUMENTS

KR       100259057        3/2000
KR      1020020087578    11/2002

OTHER PUBLICATIONS

International Search Report of PCT/KR2005/001673.

* cited by examiner

*Primary Examiner*—Un C Cho
(74) *Attorney, Agent, or Firm*—Lowe Hauptman Ham & Berner LLP

(57) ABSTRACT

Disclosed is reply voice message transmission system and method thereof for transmitting a reply voice message showing whether a voice message from a sender is received by receiver's pressing a predetermined key in a mobile phone in the course of or after hearing the voice message from the sender, in case that a voice message from the sender is transmitted to a receiver. The method comprises the steps of: a) registering a voice message from a sender; b) discriminating whether the registered voice message is confirmed by a receiver, and then storing the message in a database sequentially, in case that the voice message is not confirmed by the receiver; c) recording a reply voice message from the receiver in the course of or after hearing the voice message from the sender, in case that the voice message is confirmed by the receiver in the step (b); and d) transmitting the recorded reply voice message to a sender's mobile phone.

12 Claims, 3 Drawing Sheets

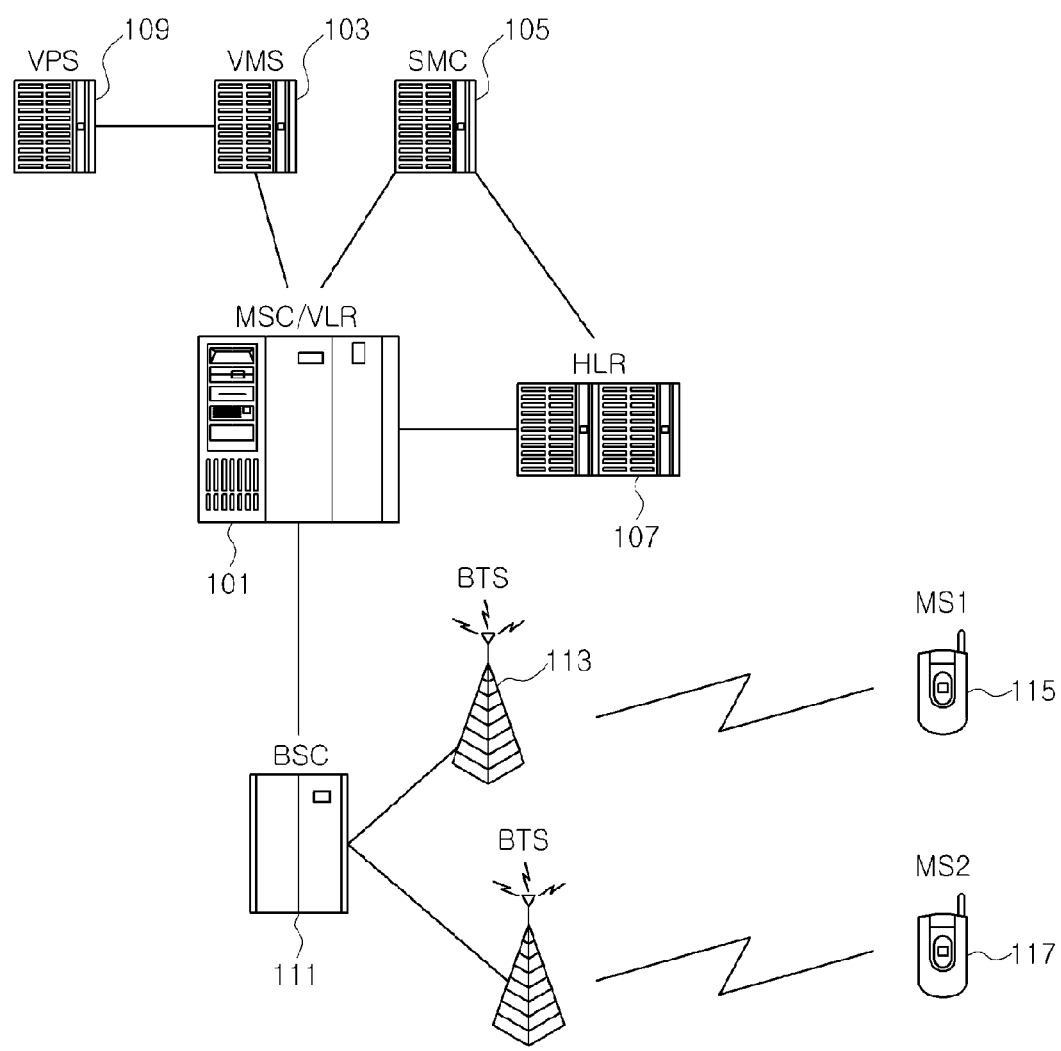
[Fig. 1]

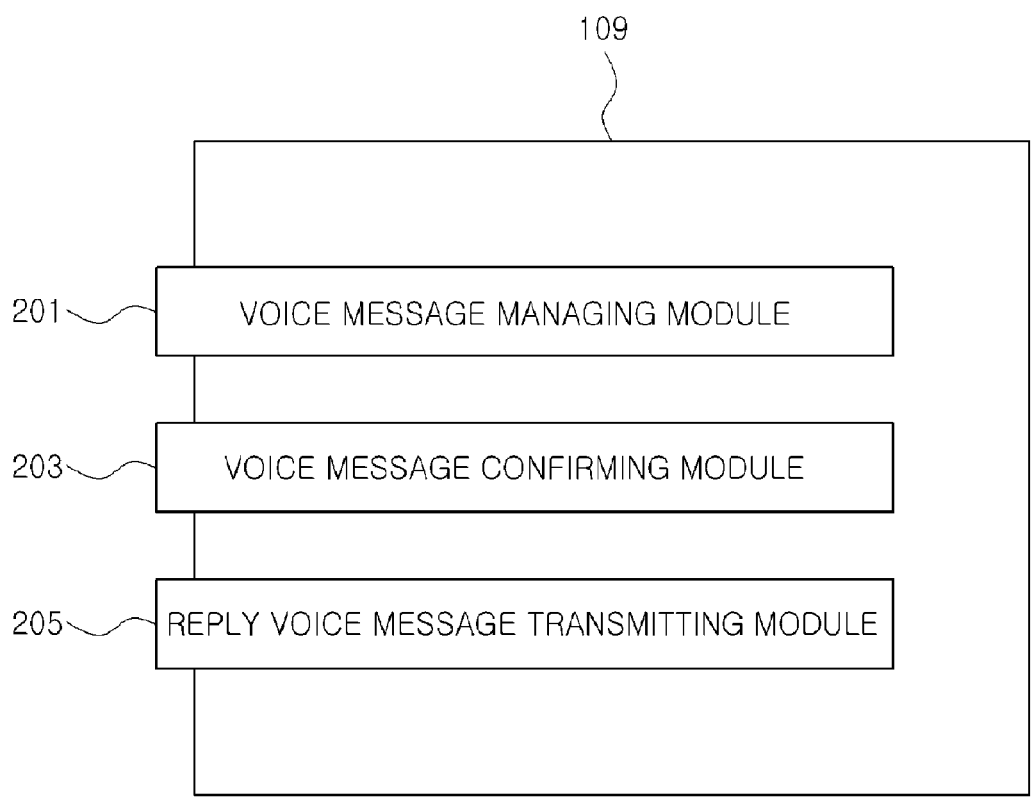

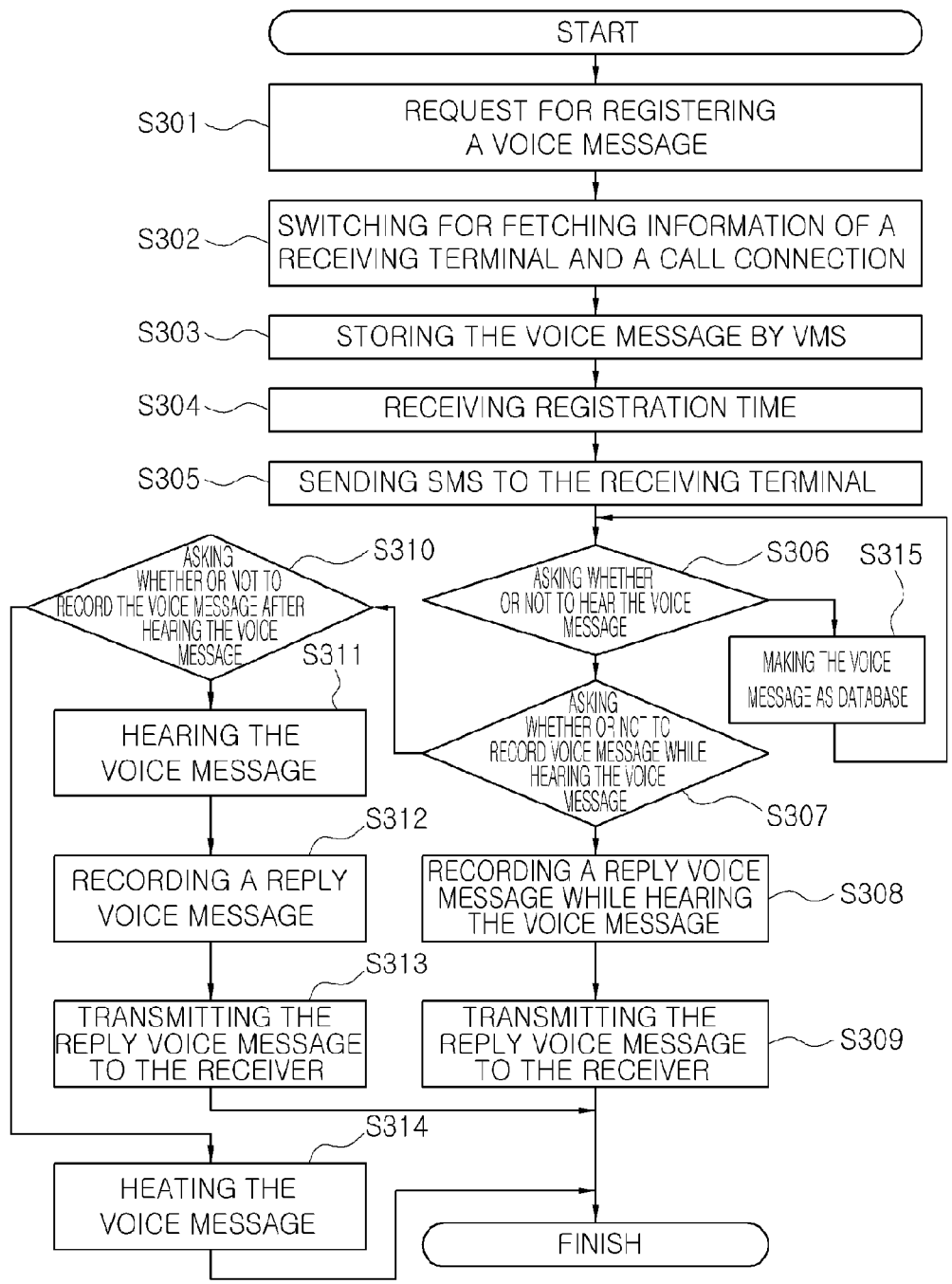

REPLY VOICE MESSAGE TRANSMISSION SYSTEM AND METHOD THEREOF

CROSS REFERENCE TO RELATED APPLICATION

This application is the National Phase application of International Application No. PCT/KR2005/001673, filed Jun. 3, 2005, which designates the United States and was published in English. This application, in its entirety, is incorporated herein by reference.

TECHNICAL FIELD

The present invention relates to a voice message transmission of a mobile communication terminal. More specifically, the present invention relates to a reply voice message transmission system and a method thereof, while a receiver hears a voice message transmitted from a sender, the receiver presses a specific key to transmit a voice message to confirm whether or not the receiver hears the message.

BACKGROUND ART

Currently, the wireless paging service comprises a numeric paging, which transmits numeric messages, and an alphanumeric paging, which transmits simple letter messages. However, since it is limited to transmit information by numbers or letters, users prefer to use a voice message being capable of expressing unique emotion of human, and the voice mailbox service using the wireless paging network is a kind of a form to satisfy such need. Herein, the voice mailbox service is defined that a sender makes a phone call to leave a voice message in the voice mailbox, the arrival of the voice message is informed to the terminal of the receiver, and the receiver hears the messages by making a phone call to the voice mailbox.

Hereinafter, the most general method of transmitting the voice message of the conventional art will be explained.

First of all, the access to the mobile communication supplementary service proceeds with by a general mobile communication call process, and when the terminal is in the state incapable of receiving, a voice paging service is operated. That is, when a call connection is requested between terminals for transmitting a voice message, the mobile switch requests the location to HLR by using a Location Request message, and the HLR confirms the location from VLR (Visitor Location Resistor) of the visiting place in which the terminal currently locates, and then transmits to the mobile communication switch.

The mobile switch sets a communication path to the visiting place switch, and then performing the paging to the mobile communication terminal. If the terminal sends a paging responding message, a two-way real time phone call is carried out as the user wishes.

However, if the terminal is in the area incapable of receiving or the power is off, the visiting place mobile communication switch connects the communication path to the voice paging center, so that a sender can leave a voice message in the voice paging center. Thereafter, the voice paging center waits and re-transmits the message by re-transmission algorithm, and if the terminal power is off and a registered message is received from the terminal via the HLR, the voice message transmission starts.

However, such voice message transmission has the structure that the voice information of the sender is stored in the voice paging center and the receiver unilaterally hears the stored voice information. Thus, there is no way for the receiver to transmit the reply voice message to the sender's terminal in response to the sender's voice message without the sender's number. Thus, it causes a lot of inconvenience in using the system. Furthermore, under the rapidly changing environment, the conventional voice message system is the system against the current trend which requires the real time network, and such system has a problem of lowering the applicability of the network.

DISCLOSURE OF INVENTION

Technical Problem

Accordingly, the present invention is conceived to resolve the aforesaid general problems of the conventional art. The object of the present invention is to provide a reply voice message transmission system and a method thereof, which can transmit the reply as a voice message by pressing a specific button of the terminal while a receiver hears the voice message transmitted to the receiver.

In addition, in terms of the sender, another object of the present invention is to provide a reply voice message transmission system and a method thereof, wherein the sender can recognize whether or not the voice message is correctly transmitted by the receiver's reply voice message received by the sending terminal, whereas the receiver can press a specific button to record and transmit the voice message while hearing the sender's specific voice message (e.g., questions or urgent messages), thereby easily transmitting the reply voice message to the sender.

According to the present invention, while hearing the voice message provided from the sending terminal, if the reply thereto is required, the receiver presses a pre-determined key to record the reply voice message and then completes hearing the sender's voice message, the reply voice message is transmitted to the sender's terminal. Thus, it can satisfy the need of both of the receiver and the sender to confirm the voice message, and the sender does not have to have wrong expectation regarding the untransmitted message. Also, the convenience in using the voice message increases.

Technical Solution

The reply voice message according to the first viewpoint of the present invention in order to achieve the above object comprises: A) a sending terminal (MS1) registering a voice message and receiving a notice of arrival of a message regarding the registered voice information; B) a base station controller (BSC) carrying out a call connection of the mobile communication network in response to a request for registering the voice message of the sending terminal MS1 received from a plurality of base stations (BTS); C) a switching station (MSC/VLR) carrying out a channel management and control connected from the base station controller (BSC) and carrying out a signal processing function according to the call connection; D) a voice message managing server (VPS), in the case that the voice message is registered and the notice of the registration of the voice message of the sending terminal MS1 is received, and in the case that the registered voice message is confirmed by a receiving terminal (MS2), generating reply information according to the confirmation of the voice message; and E) a voice mailbox server (ARS/VMS) cooperating with the switching station (MSC/VLR) to store and transmit the voice message based on the receiver's information, and storing the receiver's reply information generated by the voice message managing server (VPS) while confirming the voice message or after completing the confirmation.

Meanwhile, the method for the reply voice message according to the second viewpoint of the present invention in order to achieve the above object comprises the steps of: a) registering a voice message from a receiving terminal; b) determining whether or not the registered voice message is confirmed from the receiving terminal, and in the case that the voice message is not confirmed from the receiving terminal, making the registered voice message as database by time zone to store it; c) in the case that the voice message is confirmed from the receiving terminal in step b), recording the reply voice message from the receiver while or after hearing the voice message of the sender; and d) transmitting the reply voice message recorded by the receiver to the sending terminal.

Advantageous Effects

As explained above, the reply voice message transmission system and the method thereof according to the present invention discloses that when a receiver hears a voice message transmitted by a sending terminal and needs to respond to the message, the receiver presses a predetermined key in real time to record a reply voice message and then completes hearing the sender's voice message. Thereafter, by transmitting the reply voice message to the sender's terminal, the present invention can satisfy the mutual need for the sender and the receiver to confirm the voice message, and the sender does not have to have a wrong expectation for the undelivered message. In addition, the present invention can provide the effect of increasing the convenience in using the voice message.

Therefore, the present invention can excite the mobile communication subscribers curiosity, which were fed up with the conventional supplementary service limited to the transmission/reply service of a short text message or the transmission/hearing service of a voice message, and can provide the services to the subscribers at lower cost by using the existing network. Eventually, the present invention can have the effect of creating new services.

BRIEF DESCRIPTION OF THE DRAWINGS

FIG. 1 is a block diagram showing a system for noticing transmission result of a voice message according to the present invention.

FIG. 2 is a block diagram showing the main function of a voice message managing service according to the present invention.

FIG. 3 is an operational flow chart showing the main operation of the present invention.

BEST MODE FOR CARRYING OUT THE INVENTION

Hereinafter, the preferable embodiment of the present invention will be explained in detail by referring to the attached drawings as follows:

FIG. 1 is a block diagram showing a reply voice message transmission system according to the present invention.

As shown in FIG. 1, the reply voice message system comprises: a sending terminal (MS1) 115 registering a voice message and receiving a notice of arrival of a message regarding the registered voice information; a base station controller (BSC) 111 carrying out a call connection of the mobile communication network in response to a request for registering the voice message of the sending terminal (MS1) 115; a switching station (MSC/VLR) 101 carrying out the channel management and control connected from the base station controller and carrying out a signal processing function according to the call connection; a voice message managing server (VPS) 109, in the case of the registration of the voice message and the notice of the registration of the sending terminal (MS1) 115, and in the case that the registered voice message is voice-confirmed by a receiving terminal (MS2) 117, generating reply information according to the confirmation of the voice message; a voice mailbox server (ARS/VMS) 103 cooperating with the switching station (MSC/VLR) 101 to store and transmit the voice message based on the receiver's information, and storing the reply information of the receiver generated by the voice message managing server (VPS) 109 while confirming the voice message or after completing the confirmation; and a short message center (MSC) 105 cooperating with the switching center (MSC/VLR) 101 to transmit the registration notice according to the registration of the voice message as a from of a short message. Meanwhile, the switching center (MSC/VLR) 101 is connected to the home location registration 107 to recognize the subscriber's information about the receiving terminal 117.

As shown in FIG. 2, the voice message managing server 109 comprises: a voice message managing module 201 controlling the registration procedure of the voice message requested from the sending terminal (MS1) 115, generating the time registering the voice message according to the registration, and managing receiver's information requested to be received from the sending terminal (MS1) 115; a voice message confirming module 203 controlling the conforming procedure of the voice message of the receiving terminal (MS2) 117 for the previously registered voice message, and generating a voice message confirming signal and confirming time information according to the confirming procedure; and a reply voice message transmitting module 205 transmitting the receiver's reply voice message to the sending terminal (MS1) 115 while confirming the voice message or after completing the confirmation.

Hereinafter, the operation of the present invention will be explained in detail by referring to the attached drawings.

FIG. 3 is an operational flow chart explaining the main operation of the present invention.

As shown in FIG. 3, the sending terminal (MS1) 115 transmits a call connection request message for transmitting a voice message to a certain receiving terminal (MS2) 117, that is, for registering the voice message, to the switching center (MSC/VLR) 101 via the base station controller (BSC) 111 (S301). At this time, the registration of the voice message may require a call connection having a separate specific number. However, if the call is not received for a predetermined time when trying to make the phone call, the receiving terminal (MS1) 115 is automatically switched to a voice mailbox mode to be provided with the voice message registration procedure.

Thereafter, the switching (MSC/VLR) 101 fetches terminal information of the sending terminal (MS1) 115 via the visitor location (VLR) 101, and performing the switching for the call connection based on the number information of the receiving terminal (MS2) 117 according to the call connection request (S302). When a pre-determined time passes after the switching process, the switching station (MSC/VLR) 101 guides the procedure for registering the voice message, and connects to the voice mailbox server (VMS) 103. Thus, the voice message is stored in the voice mailbox server (VMS) 103 according to the predetermined registration procedure (S303). In view of the receiver, the receiver records the voice message by a predetermined key operation of the receiving terminal (MS1) 115, and stores the recorded voice message in the voice mailbox server (VMS) 103.

At this time, the voice message managing server (VPS) 109 receives a request for managing a voice message from the switching center (MSC/VLR) 101. Thereafter, the voice message managing server (VPS) 109 drives the voice message managing module 201 to generate and store the registration time information according to the registration of the current voice message (S304). Then, the short message center (SMC) 105 sends a short message for noticing the arrival of the voice message is arrived to the receiving terminal (MS2) 117 (S305). Otherwise, in addition to the process of sending the short message, it is possible to directly connect to the receiving terminal by outdialling of the voice message managing server (VPS) 109. The receiving terminal (MS2) 117 confirms the short message, and then asks the receiver whether or not to hear the voice message transmitted from the sender (S306).

As a result of the step of asking (S306), if the receiver executes a simple key operation to hear the voice message, a call connection between the receiving terminal (MS2) 117 and the switching center (MSC/VLR) 101 is performed, so that the receiver can hear the voice message. This process will be explained as follows:

First of all, the receiving terminal (MS2) 117 tries a call connection by inputting voice message connecting number information (*88) to perform the connection to the voice mailbox server (VMS) 103 via the switching center (MSC/VLR) 101. If the call is connected to the switching center (MSC/VLR) 101, the switching center (MSC/VLR) 101 sends it to the voice message managing server (VPS) 109, and the voice message managing server (VPS) 109 drives the voice message confirming module 203 to guide the voice message confirming process to the receiving terminal (MS2) 117.

In the step of confirming the sender's voice message, the receiving terminal (MS2) 117 inputs a predetermined password information (xxxx), which is previously set, to performing an authentication process required from the voice message managing server (VPS) 109. After the authentication process is completed, the voice message server (VPS) 109 provides result information according to the authentication result to the switching center (MSC/VLR) 101. Thereafter, the switching center (MSC/VLR) 101 instructs the voice message mailbox server (MS) 103 to provide the voice message information, which is previously stored. Accordingly, the voice message hearing process is performed according to the step (S036).

While or after hearing the sender's voice message, the processes (S307-S314) of transmitting the reply voice message of the receiver are as follows:

As a result of the step of asking (S306), if the receiver sets to hear the sender's voice message, the receiving terminal (MS2) 117 asks the receiver whether or not to record the reply message while hearing the voice message (S307).

As a result of the step of asking of (S307), if the receiver determines recording the reply voice message while hearing the voice message, while playing back (hearing) the voice message of the voice mailbox server (VMS) 103, the voice message managing server (VPS) 109 drives the reply voice message transmitting module 205 to perform the control according to the reply voice message recording process, thereby performing the recording of the receiver's reply voice message (S308). At this time, the receiver clicks a specific button of the terminal to perform the recording operation. The receiver's recorded reply voice message is stored in a predetermined area of the voice mailbox server (VMS) 103.

Thereafter, when the playing back of the voice message of the voice mailbox server (VMS) 103 is completed, the receiver's reply voice message, which is recorded and stored, is transmitted to the sender via the call connection process of the switching station (MSC/VLR) 101 (S309).

As a result of the step of asking of (S307), if the receiver does not want to record the reply voice message while hearing the voice message, the receiving terminal (MS2) 117 asks the receiver whether or not to record the reply voice message after hearing the voice message (s310). As a result of the step of asking (S310), the voice mailbox server (VMS) 103 completes playing back of the receiver's voice message (hearing) (S311), the voice message managing server (VPS) 109 drives the reply voice message transmitting module 205 to perform the control according to the reply voice message recording process, thereby performing the sender's reply voice message recording (S312). At this time, as mentioned above, the receiver clicks a specific button of the terminal to perform the recording operation. The receiver's recorded reply voice message is stored in a predetermined area of the voice mailbox server (VMS) 103.

Thereafter, as aforesaid step (S309), when the playing back of the voice message of the voice mailbox server (VMS) 103 is completed, the receiver's reply voice message, which is recorded and stored, is transmitted to the sender via the call connection process of the switching station (MSC/VLR) 101.

Meanwhile, as a result of the step of asking (S310), if the receiver does not want to record the reply voice message after hearing the voice message, the playing back (hearing) of the sender's voice message stored in the voice mailbox server (VMS) 103 is completed (S314), and then all of the operations are completed.

In the above embodiment, the receiving terminal (MS2) 117 asks to first set whether or not to record the reply voice message while or after the receiver hears the voice message. However, in another embodiment, the above process can be performed by clicking a specific button while or after hearing the voice message without the above asking process.

Meanwhile, as a result of the step of asking (S306), if the receiver does not want to hear the sender's voice message, that is, the receiver terminal (MS2) does not want to confirm registered voice message information from the sending terminal (MS1) 115, the voice message information is stored in a predetermined area of the voice mailbox server (VMS) 103 as a database (S315).

The receiver can delete the voice messages information as database. If it is not deleted, it can be stored in a memory of the terminal for a predetermined term and then automatically deleted. In addition, since the network already recognizes the voice message information as database (which is not transmitted to the receiver or not confirmed by the receiver), a person skilled in the art can embody the notice of the message to the sender periodically or in real time.

Accordingly, in view of the sender, by confirming the receiver's reply voice message received via the sending terminal, the sender can recognize whether or not the voice message is correctly transmitted to the receiving terminal. Also, in view of the receiver, while hearing the sender's specific voice message (e.g., the message including the sender's question or the message requiring an urgent reply), by pressing a specific button to record and transmit a voice message, the receiver can transmit the reply voice message to the sender.

Meanwhile, the preset invention describes that the reply voice message is transmitted between the mobile communication terminals. However, it is absolutely possible to register a voice message on WAP and WEB and to register a reply voice message for the registered voice message. For example, the reply voice message can be transmitted via cable & wireless terminal such as computer and PDA.

Also, the embodiments according to the present invention describe only the reply voice message for the voice message. However, texts, moving images, images, avatars can be added to the reply voice message.

INDUSTRIAL APPLICABILITY

The present invention relates to a voice message transmission of a mobile communication terminal. More specifically, the present invention relates to a reply voice message transmitting system and the method thereof, in which while a receiver hears the voice message transmitted from the sender, the receiver can transmit a reply as a voice message by pressing a specific key of a terminal.

The invention claimed is:

1. A reply voice message transmission system comprising:
   A) a sending terminal (MS1) registering a voice message and receiving a notice of a message regarding the registered voice information;
   B) a base station controller (BSC) carrying out a call connection of the mobile communication network in response to a request for registering the voice message of the sending terminal MS1 received from a plurality of base stations (BTS);
   C) a switching station (MSC/VLR) carrying out a channel management and control connected from the base station controller (BSC) and carrying out a signal processing function according to the call connection;
   D) a voice message managing server (VPS), in the case that the voice message is registered and the notice of the registration of the voice message of the sending terminal MS1 is received, and in the case that the registered voice message is confirmed by a receiving terminal (MS2), generating reply information according to the confirmation of the voice message;
   E) a short message center (SMC) cooperating with the switching center (MSC/VLR) to transmit the registration notice according to the registration of the voice message as a form of a short message; and
   F) a voice mailbox server (ARS/VMS) cooperating with the switching station (MSC/VLR) to store and transmit the voice message based on the receiver's information, and storing the receiver's reply information generated by the voice message managing server (VPS) while confirming the voice message or after completing the confirmation, wherein the reply information is a reply voice message recorded by the receiver, and the recording of the reply voice message is performed by the receiver's click of a specific button of the receiving terminal.

2. The reply voice message according to claim 1, wherein multimedia messages including texts, moving images, images, avatars can be added to the reply voice message.

3. The reply voice message transmission system according to claim 1, wherein the voice mailbox server stores the receiver's voice message, which is not confirmed, as database; the receiver can delete the voice message information as database; and if the voice message information is not deleted, it can be stored in a memory of the terminal for a predetermined term and then automatically deleted.

4. The reply voice message transmission system according to claim 1, the voice message managing server comprising the steps of:
   D-1) a voice message managing module controlling the registration procedure of the voice message requested from the sending terminal (MS1), generating the time registering the voice message according to the registration, and managing receiver's information requested to be received from the sending terminal (MS1);
   D-2) a voice message confirming module controlling the confirming procedure of a preregistered voice message by the voice message managing module of the receiving terminal (MS2), and generating a voice message confirming signal and confirming time information according to the confirming procedure; and
   D-3) a reply voice message transmitting module transmitting the receiver's reply voice message to the sending terminal (MS1) while or after confirming the voice message.

5. A method for transmitting a reply voice message, comprising the steps of:
   a) registering a voice message from a receiving terminal;
   b) determining whether or not the registered voice message is confirmed from the receiving terminal, and in the case that the voice message is not confirmed from the receiving terminal, making the registered voice message as database by time zone to store it;
   c) in the case that the voice message is confirmed from the receiving terminal in step b), recording a reply voice message from the receiver while or after hearing the voice message of the sender, wherein the short message center (SMC) sends to the receiving terminal a short message for a notice of registration according to the voice message registration, and wherein recording the reply voice message is performed by the receiver's click of a specific button of the receiving terminal, and wherein the receiver's recorded reply voice message is stored in the voice mailbox server; and
   d) transmitting the reply voice message recorded by the receiver to the sending terminal.

6. The method for transmitting a reply voice message according to claim 5, characterized in that multimedia messages including texts, moving images, images, avatars can be added to the reply voice message.

7. The method for transmitting a reply voice message according to claim 5, characterized in that the confirmation of the voice message in the step c) is performed by outdialling by the voice message managing server (VPS) to be directly connected to the receiving terminal.

8. The method for transmitting a reply voice message according to claim 5 comprising the steps of:
   c-1) outdialing the registered voice message to the receiving terminal by the voice mailbox server;
   c-2) noticing the outdialing state from the voice mailbox server to the short message center;
   and c-3) noticing the arrival of the voice message from the short message center to the receiving terminal.

9. The method for transmitting a reply voice message according to claim 5, characterized in that the voice mailbox server stores the sender's voice message, which is not confirmed, as database; the receiver can delete the voice messages information as database; and if the voice messages information is not deleted, it can be stored in a memory of the terminal for a predetermined term and then automatically deleted.

10. A method for transmitting a reply voice message comprising the steps of:
   i) registering a voice message from a receiving terminal;
   ii) sending a short message to notice the arrival of the voice message by a short message center;
   iii) in the case that the voice message is confirmed from the receiving terminal in step ii), recording the reply voice message from the receiver while or after hearing the voice message of the sender; and iv) transmitting the reply voice message recorded by the receiver to the sending terminal, wherein the recording the reply voice message is performed by the receiver's click of a specific button of the receiving terminal; and the receiver's recorded reply voice message is stored in the voice mailbox server.

11. The method for transmitting a reply voice message according to claim 10, characterized in that multimedia messages including texts, moving images, images, avatars can be added to the reply voice message.

12. The method for transmitting a reply voice message according to claim 10, characterized in that the confirmation of the voice message of the step iii) is performed by the short message center (SMC) sending a short message for a notice of registration according to the voice message registration to the receiving terminal.

* * * * *